US012669730B2

(12) United States Patent
Yun et al.

(10) Patent No.: US 12,669,730 B2
(45) Date of Patent: Jun. 30, 2026

(54) DISPLAY APPARATUS

(71) Applicant: SAMSUNG ELECTRONICS CO., LTD., Suwon-si (KR)

(72) Inventors: Jeeyoul Yun, Suwon-si (KR); Jaesun Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/089,526

(22) Filed: Mar. 25, 2025

(65) Prior Publication Data

US 2025/0321449 A1 Oct. 16, 2025

Related U.S. Application Data

(63) Continuation of application No. PCT/KR2025/002747, filed on Feb. 27, 2025.

(30) Foreign Application Priority Data

Apr. 16, 2024 (KR) ........................ 10-2024-0051019

(51) Int. Cl.
*G02F 1/13357* (2006.01)
(52) U.S. Cl.
CPC .. *G02F 1/133608* (2013.01); *G02F 1/133605* (2013.01); *G02F 2201/46* (2013.01)
(58) Field of Classification Search
CPC ...... F16B 15/0015; F21V 17/10; F21V 17/16; F21V 17/164; F21V 17/06;

(Continued)

(56) References Cited

U.S. PATENT DOCUMENTS 3,941,995 A * 3/1976 Fritz ........................ F21S 8/02
362/147
4,129,059 A * 12/1978 Van Eck ............. F16B 15/0015
411/475

(Continued)

FOREIGN PATENT DOCUMENTS

CN 1039561 A 2/1990
CN 1103161 A 5/1995

(Continued)

OTHER PUBLICATIONS

John, "The Key Properties of Stainless Steel: What You Need to Know", Aug. 8, 2024, Steel Pro Group, accessed at https://steelprogroup.com/stainless-steel/properties/ on Oct. 17, 2025 (Year: 2024).*

*Primary Examiner* — Erin Kryukova
(74) *Attorney, Agent, or Firm* — Sughrue Mion, PLLC

(57) ABSTRACT

A display apparatus includes a display panel; a reflective sheet on a rear side of the display panel and configured to reflect light toward the display panel; a rear chassis configured to support the reflective sheet on a rear side of the reflective sheet, the rear chassis including a fixing hole; and a fastener configured to secure the reflective sheet to the rear chassis; wherein the fastener includes: an insertion portion configured to penetrate the reflective sheet and to be inserted into the fixing hole; and a bending portion bent at a first end of the insertion portion to prevent the insertion portion from being withdrawn from the fixing hole.

20 Claims, 11 Drawing Sheets

(58) Field of Classification Search
  CPC .......... F21Y 2105/16; G02F 1/133608; G02F
          1/133605; G02F 1/133603; G02F
          2201/46; G02F 2201/465; B65H 37/04;
          B65H 2301/51611; B42B 5/00
  See application file for complete search history.

(56)             References Cited

U.S. PATENT DOCUMENTS

| | | | |
|---|---|---|---|
| 5,624,109 A | 4/1997 | Tanaka | |
| 5,855,430 A | 1/1999 | Coushaine et al. | |
| 5,907,745 A | 5/1999 | Azuma et al. | |
| 6,175,396 B1 * | 1/2001 | Kim ................. G02F 1/133308 | |
| | | | 361/679.21 |
| 6,222,302 B1 | 4/2001 | Imada et al. | |
| 6,874,395 B2 | 4/2005 | Ishii et al. | |
| 6,977,336 B2 | 12/2005 | Enmoto et al. | |
| 7,013,887 B2 | 3/2006 | Kuckelkorn et al. | |
| 7,117,710 B2 | 10/2006 | Kurita et al. | |
| 7,160,019 B1 | 1/2007 | Kawakami | |
| 7,390,104 B2 | 6/2008 | Coushaine | |
| 7,520,067 B2 | 4/2009 | Yoshizumi et al. | |
| 7,683,894 B2 | 3/2010 | Kent | |
| 8,387,747 B2 | 3/2013 | Koike et al. | |
| 9,534,743 B2 | 1/2017 | Allen et al. | |
| 9,650,022 B2 | 5/2017 | Yang et al. | |
| 11,691,239 B2 | 7/2023 | Yang et al. | |
| 12,148,845 B2 | 11/2024 | Zang et al. | |
| 2001/0010634 A1 | 8/2001 | Yokoi | |
| 2005/0265020 A1 | 12/2005 | Kim | |
| 2006/0012982 A1 * | 1/2006 | Kuo ................. G02F 1/133608 | |
| | | | 362/217.05 |
| 2007/0047228 A1 * | 3/2007 | Thompson ........ G02F 1/133603 | |
| | | | 362/240 |
| 2008/0068836 A1 | 3/2008 | Hatanaka et al. | |
| 2011/0041834 A1 | 2/2011 | Liao | |
| 2011/0249203 A1 * | 10/2011 | Takeba .............. G02F 1/133604 | |
| | | | 348/790 |
| 2011/0310326 A1 * | 12/2011 | Kitada .............. G02F 1/133608 | |
| | | | 349/61 |
| 2012/0169944 A1 * | 7/2012 | Kuromizu ......... G02F 1/133605 | |
| | | | 348/790 |
| 2013/0321717 A1 * | 12/2013 | Kuromizu ......... G02F 1/133611 | |
| | | | 349/67 |
| 2016/0123555 A1 * | 5/2016 | Oh .................... G02F 1/133611 | |
| | | | 362/97.1 |
| 2016/0212822 A1 | 7/2016 | Kim | |
| 2017/0235189 A1 * | 8/2017 | Nitanai ............. G02F 1/133605 | |
| | | | 362/97.1 |
| 2019/0178471 A1 | 6/2019 | Di Trapani | |
| 2021/0190918 A1 | 6/2021 | Li et al. | |

FOREIGN PATENT DOCUMENTS

| | | | | | |
|---|---|---|---|---|---|
| CN | 1117013 A | 2/1996 | | | |
| CN | 1118890 A | 3/1996 | | | |
| CN | 1165485 A | 11/1997 | | | |
| CN | 1179845 A | 4/1998 | | | |
| CN | 1200452 A | 12/1998 | | | |
| CN | 1214551 A | 4/1999 | | | |
| CN | 1250003 A | 4/2000 | | | |
| CN | 1278088 A | 12/2000 | | | |
| CN | 1284657 A | 2/2001 | | | |
| CN | 1307203 A | 8/2001 | | | |
| CN | 1320099 A | 10/2001 | | | |
| CN | 1321910 A | 11/2001 | | | |
| CN | 1357427 A | 7/2002 | | | |
| CN | 1374157 A | 10/2002 | | | |
| CN | 1374465 A | 10/2002 | | | |
| CN | 1482417 A | 3/2004 | | | |
| CN | 1519504 A | 8/2004 | | | |
| CN | 1587969 A | 3/2005 | | | |
| CN | 1588465 A | 3/2005 | | | |
| CN | 1624460 A | 6/2005 | | | |
| CN | 1647950 A | 8/2005 | | | |
| CN | 1661295 A | 8/2005 | | | |
| CN | 1712888 A | 12/2005 | | | |
| CN | 1820034 A | 8/2006 | | | |
| CN | 1866637 A | 11/2006 | | | |
| CN | 1868419 A | 11/2006 | | | |
| CN | 1875217 A | 12/2006 | | | |
| CN | 1915631 A | 2/2007 | | | |
| CN | 101142436 A | 3/2008 | | | |
| CN | 101203708 A | 6/2008 | | | |
| CN | 101206110 A | 6/2008 | | | |
| CN | 101285904 A | 10/2008 | | | |
| CN | 101377357 A | 3/2009 | | | |
| CN | 101387607 A | 3/2009 | | | |
| CN | 101430081 A | 5/2009 | | | |
| CN | 101449098 A | 6/2009 | | | |
| CN | 101559539 A | 10/2009 | | | |
| CN | 101660678 A | 3/2010 | | | |
| CN | 101667604 A | 3/2010 | | | |
| CN | 101709264 A | 5/2010 | | | |
| CN | 101709597 A | 5/2010 | | | |
| CN | 101726109 A | 6/2010 | | | |
| CN | 101788111 A | 7/2010 | | | |
| CN | 101797665 A | 8/2010 | | | |
| CN | 101893021 A | 11/2010 | | | |
| CN | 101893340 A | 11/2010 | | | |
| CN | 101919783 A | 12/2010 | | | |
| CN | 101997453 A | 3/2011 | | | |
| CN | 102262281 A | 11/2011 | | | |
| CN | 102269363 A | 12/2011 | | | |
| CN | 102282013 A | 12/2011 | | | |
| CN | 102423875 A | 4/2012 | | | |
| CN | 102444871 A | 5/2012 | | | |
| CN | 102513440 A | 6/2012 | | | |
| CN | 102537768 A | 7/2012 | | | |
| CN | 102699359 A | 10/2012 | | | |
| CN | 102700513 A | 10/2012 | | | |
| CN | 102859257 A | 1/2013 | | | |
| CN | 102922147 A | 2/2013 | | | |
| CN | 103162094 A | 6/2013 | | | |
| CN | 107715949 A | 2/2018 | | | |
| CN | 107984303 A | 5/2018 | | | |
| CN | 108072951 A | 5/2018 | | | |
| CN | 108075226 A | 5/2018 | | | |
| CN | 108565150 A | 9/2018 | | | |
| CN | 108758757 A | 11/2018 | | | |
| CN | 108761471 A | 11/2018 | | | |
| CN | 108828558 A | 11/2018 | | | |
| CN | 108873132 A | 11/2018 | | | |
| CN | 108890139 A | 11/2018 | | | |
| CN | 108943131 A | 12/2018 | | | |
| CN | 109083347 A | 12/2018 | | | |
| CN | 109164129 A | 1/2019 | | | |
| CN | 109296996 A | 2/2019 | | | |
| CN | 109333162 A | 2/2019 | | | |
| CN | 109343294 A | 2/2019 | | | |
| CN | 109578759 A | 4/2019 | | | |
| CN | 109659374 A | 4/2019 | | | |
| CN | 110146460 A | 8/2019 | | | |
| CN | 110252891 A | 9/2019 | | | |
| CN | 110398202 A | 11/2019 | | | |
| CN | 110405366 A | 11/2019 | | | |
| CN | 111069895 A | 4/2020 | | | |
| CN | 111912354 A | 11/2020 | | | |
| CN | 111975501 A | 11/2020 | | | |
| CN | 112013954 A | 12/2020 | | | |
| CN | 112878232 A | 6/2021 | | | |
| CN | 113102892 A | 7/2021 | | | |
| CN | 113911284 A | 1/2022 | | | |
| CN | 114474984 A | 5/2022 | | | |
| JP | 2008-41900 A | 2/2008 | | | |
| JP | 2021-23505 A | 2/2021 | | | |
| KR | 20-1990-0007382 Y1 | 8/1990 | | | |
| KR | 10-2002-0052922 A | 7/2002 | | | |
| KR | 20040074218 A | * 8/2004 | .......... | G02F 1/1335 |
| KR | 10-2005-0107034 A | 11/2005 | | | |
| KR | 10-2006-0117420 A | 11/2006 | | | |

(56)           References Cited

FOREIGN PATENT DOCUMENTS

KR      10-2007-0020238  A      2/2007
KR           10-1374736  B1      3/2014

* cited by examiner

DISPLAY APPARATUS

CROSS-REFERENCE TO RELATED APPLICATIONS

This application is a by-pass continuation of International Application No. PCT/KR2025/002747, filed on Feb. 27, 2025, which is based on and claims priority to Korean Patent Application No. 10-2024-0051019, filed in the Korean Intellectual Property Office on Apr. 16, 2024, the disclosures of which are incorporated by reference herein in their entireties.

BACKGROUND

1. Field

The disclosure relates to a display apparatus including a reflective sheet.

2. Description of Related Art

In general, a display apparatus is a type of output device that converts acquired or stored electrical information into visual information and displays information to a user.

Display apparatuses may include a monitor device connected to a personal computer (PC) or a server computer, a portable computer device, a navigation terminal device, a general purpose television device, an internet protocol television (IPTV) device, a portable terminal device, such as a smart phone, a tablet PC, a personal digital assistant (PDA), a cellular phone, or the like, various display devices used to play images such as advertisements or movies in industrial sites, or various other audio/video systems.

Display apparatuses may include a light source module to convert electrical information into visual information, and the light source module may include a plurality of light sources for independently emitting light.

Each of the plurality of light sources may include, for example, a light-emitting diode (LED) or an organic LED (OLED). For example, the LED or the OLED may be mounted on a circuit board or substrate.

SUMMARY

Provided is a display apparatus which is configured in a manner that allows for efficient assembly.

Further, provided is a display apparatus with improved productivity and uniform quality characteristics based on automation of the fastening of reflective sheets.

Further, provided is a display apparatus capable of preventing wrinkles on the reflective sheet which may be caused by contraction and expansion of the reflective sheet.

The disclosure is not limited to the technical characteristics and features mentioned above, and other technical characteristics and features not mentioned will be clearly understood by those skilled in the art from the description below.

According to an aspect of the disclosure, a display apparatus includes: a display panel; a reflective sheet on a rear side of the display panel and configured to reflect light toward the display panel; a rear chassis configured to support the reflective sheet on a rear side of the reflective sheet, the rear chassis including a fixing hole; and a fastener configured to secure the reflective sheet to the rear chassis; wherein the fastener includes: an insertion portion configured to penetrate the reflective sheet and to be inserted into the fixing hole; and a bending portion bent at a first end of the insertion portion to prevent the insertion portion from being withdrawn from the fixing hole.

The reflective sheet includes a through hole, the insertion portion may inserted into the through hole, and the through hole may formed by the insertion portion penetrating the reflective sheet.

The fixing hole may include a first fixing hole and a second fixing hole spaced apart from the first fixing hole.

The fastener further may include: a first insertion portion configured to penetrate the reflective sheet and to be inserted into the first fixing hole; a second insertion portion configured to penetrate the reflective sheet and to be inserted into the second fixing hole; a first bending portion bent at a first end of the first insertion portion; and a second bending portion bent at a first end of the second insertion portion.

The first bending portion may bent toward the second fixing hole, and the second bending portion may bent toward the first fixing hole.

The fastener further may include a connecting portion connecting a second end of the first insertion portion and a second end of the second insertion portion, the connecting portion may be on a front side of the reflective sheet, and the first bending portion and the second bending portion may be on the rear side of the reflective sheet and the rear chassis.

A first gap may exist between the first insertion portion and an inner edge of the first fixing hole, and a second gap may exist between the second insertion portion and an inner edge of the second fixing hole.

A length of the first bending portion may greater than the first gap, and a length of the second bending portion may greater than the second gap.

The display apparatus may further include a light source module configured to supply light to a rear side of the display panel, and the reflective sheet may include: a seating portion configured to seat the light source module thereon; and an inclined portion that may inclined forwardly relative to the seating portion.

The fixing hole may be at a position corresponding to the inclined portion.

The reflective sheet further may include an outer portion along an edge of the inclined portion and configured to contact an edge of the rear chassis, and the fixing hole may be at a position corresponding to the outer portion.

The inclined portion may be darker than the seating portion such that luminance of the inclined portion is lower than luminance of the seating portion.

The display apparatus may further include: an optical member between the display panel and the reflective sheet; and a supporter on the reflective sheet and configured to support the optical member.

The fastener may include at least one of stainless steel and paper.

The insertion portion may be movably arranged within the fixing hole and may be movable, within a predetermined range, relative to the rear chassis.

The fastener may include a staple.

According to an aspect of the disclosure, a display apparatus includes: a display panel; a reflective sheet on a rear side of the display panel; a rear chassis supporting a rear side of the reflective sheet, the rear chassis including a pair of fixing holes including a first fixing hole and a second fixing hole; and a fastener configured to secure the reflective sheet to the rear chassis, the fastener including: a first insertion portion penetrating the reflective sheet and inserted into the first fixing hole; a second insertion portion penetrating the reflective sheet inserted into the second fixing hole; a first bending portion bent at a first end of the first insertion portion; and a second bending portion bent at a first end of the second insertion portion.

The display apparatus may further include a light source configured to supply light to the display panel, and the reflective sheet may include: a seating portion, wherein the light source may seated on the seating portion; and an inclined portion at least partially surrounding the seating portion, wherein the inclined portion may inclined forwardly relative to the seating portion.

The pair of fixing holes may be at a position corresponding to at least one of the seating portion or the inclined portion.

According to an aspect of the disclosure, a display apparatus includes: a display panel; a light source configured to supply light to the display panel; a reflective sheet on a rear side of the display panel and the light source, the reflective sheet including: a seating portion, wherein the light source is seated on the seating portion; and an inclined portion at least partially surrounding the seating portion, wherein the inclined portion is inclined forwardly relative to the seating portion; a rear chassis supporting a rear side of the reflective sheet, the rear chassis including a plurality of pairs of fixing holes; and a plurality of fasteners respectively corresponding to the plurality of pairs of fixing holes, wherein the plurality of fasteners are configured to secure the reflective sheet to the rear chassis, wherein each of the plurality of pairs of fixing holes includes a first fixing hole and a second fixing hole, and wherein each of the plurality of fasteners includes: a first insertion portion penetrating the reflective sheet and inserted into the first fixing hole of the pair of fixing holes corresponding to the fastener; a second insertion portion penetrating the reflective sheet inserted into the second fixing hole of the pair of fixing holes corresponding to the fastener; a first bending portion bent at a first end of the first insertion portion; and a second bending portion bent at a first end of the second insertion portion.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1:
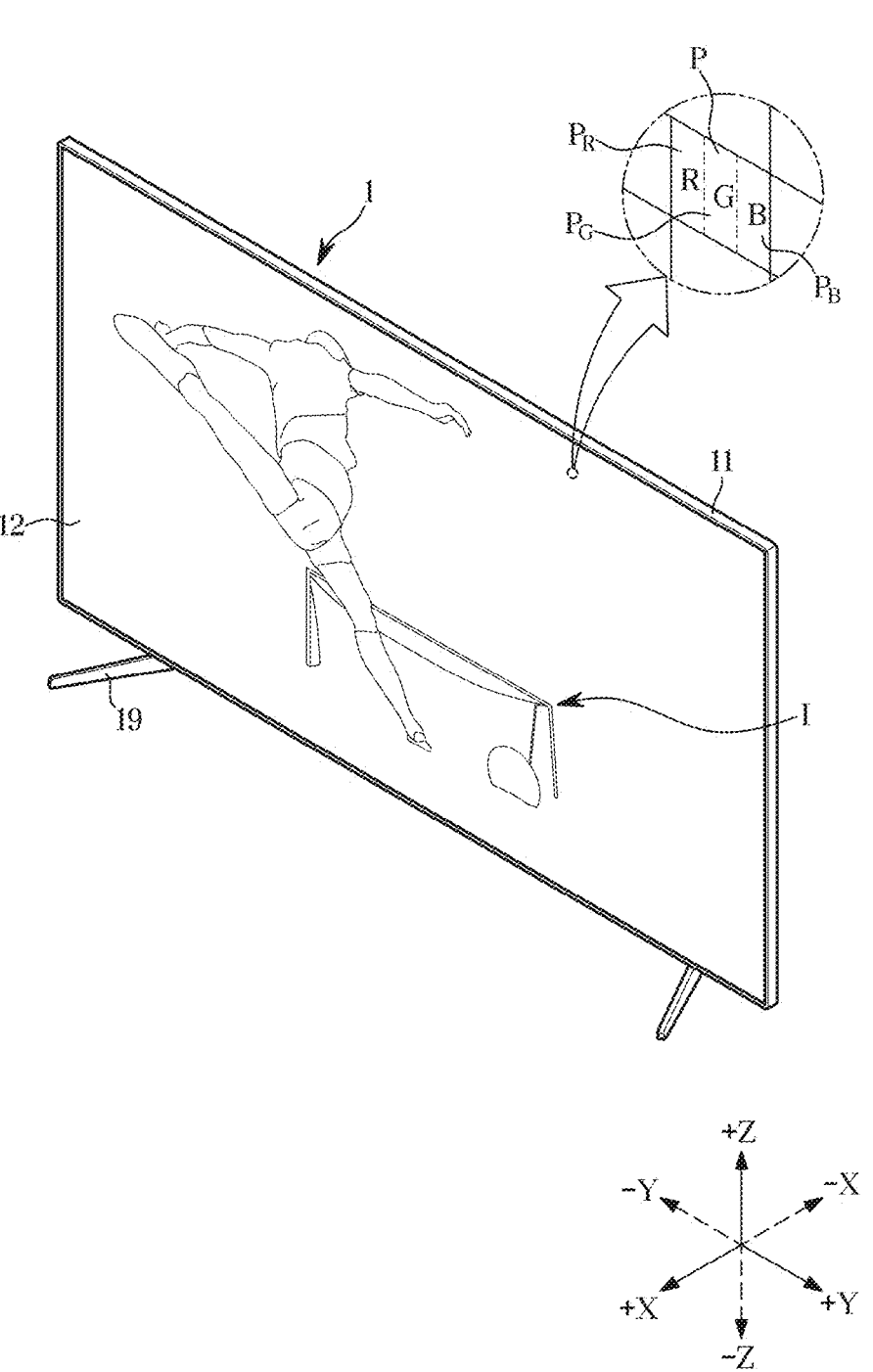
FIG. 1 shows a display apparatus according to one or more embodiments.

Various embodiments described and shown in the present disclosure and terms used therein are not intended to limit the technical features described in this disclosure to specific embodiments, and the disclosure should be understood to include various modifications, equivalents, or substitutes of the corresponding embodiments.

In connection with the description of the drawings, similar reference numerals may be used for similar or related components.

The singular form of a noun corresponding to an item may include one or a plurality of the items unless clearly indicated otherwise in a related context.

As used herein, phrases, such as "A or B", "at least one of A and B", "at least one of A or B," "A, B or C," "at least one of A, B and C," and "at least one of A, B, or C", may include any one or all possible combinations of items listed together in the corresponding phrase among the phrases.

In addition, the terms "portion", "part", "module" and "member" may be implemented in hardware or software. Depending on the embodiments, a plurality of "portions", "parts", "modules", and "members" may be implemented as a single element, or a single "portion", "part", "module", or "member" may include a plurality of elements.

Also, the terms used herein are used to describe the embodiments and are not intended to limit and/or restrict the disclosure. The singular forms "a", "an" and "the" are intended to include the plural forms as well, unless the context clearly indicates otherwise. In this disclosure, the terms "including", "having", and the like are used to specify features, figures, steps, operations, elements, components, or combinations thereof, but do not preclude the presence or addition of one or more of the features, figures, steps, operations, elements, components, or combinations thereof.

It will be understood that, although the terms "first", "second", "primary", "secondary", etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

When an element (e.g., a first element) is referred to as being "(functionally or communicatively) coupled" or "connected" to another element (e.g., a second element), the first element may be connected to the second element, directly (e.g., wired), wirelessly, or through a third element.

When a given element is referred to as being "connected to", "coupled to", "supported by" or "in contact with" another element, it is to be understood that it may be directly or indirectly connected to, coupled to, supported by, or in contact with the other element. When a given element is indirectly connected to, coupled to, supported by, or in contact with another element, it is to be understood that it may be connected to, coupled to, supported by, or in contact with the other element through a third element.

It will also be understood that when an element is referred to as being "on" another element, it may be directly on the other element or intervening elements may also be present.

The terms "up," "down," "front," "rear," and the like used in the following description may be defined with reference to the drawings, and the shape and position of each element are not limited by these terms. For example, the terms "front" and "rear" below may each be defined with reference to an X direction shown in the drawings, respectively. The terms "up" and "down" below may each be defined with reference to a Z direction shown in the drawings. The terms "left" and "right" below may each be defined with reference to a Y direction shown in the drawings. The terms "vertical direction" below may be defined with reference to the Z direction shown in the drawings, and the terms "horizontal direction" below may be defined with reference to the Y direction shown in the drawings.

Hereinafter, one or more embodiments of the disclosure will be described in detail with reference to the accompanying drawings.

FIG. 1 is a view showing a display apparatus according to one or more embodiments.

Referring to FIG. 1, a display apparatus 1 according to one or more embodiments may process an image signal received from an external source and visually display the processed image. FIG. 1 shows a case where the display apparatus 1 is a television (TV), but is not limited thereto. For example, the display apparatus 1 may include various devices, such as a monitor, which is a type of a computer output device, and a portable multimedia device, a portable communication device. The display apparatus 1 is not limited in shape as long as it is an apparatus that visually displays an image (picture, video, etc.).

The display apparatus 1 may include a large format display (LFD) that is installed outdoors, for example on the roof of a building or at a bus stop. The outdoors is not necessarily be limited to outside, and may include places where many people may come and go, even if they are indoors, such as subway stations, shopping malls, movie theaters, companies, and shops.

FIG. 1 shows an example of a flat panel display apparatus having a flat screen, but is not limited thereto. The display apparatus according to the present disclosure may include a curved display apparatus or a bendable or flexible display apparatus in which flat and curved states are variable. The display apparatus 1 is not limited in its screen size or ratio and may include a screen of various shapes.

The display apparatus 1 may receive content including video signals and audio signals from various content sources, and output video and audio corresponding to the video signals and audio signals. For example, the display apparatus 1 may receive content data via a broadcast reception antenna or a wired cable, receive content data from a content playback device, or receive content data from a content provider's content delivery server.

The display apparatus 1 may display an image corresponding to the video data and output sound corresponding to the audio data. For example, the display apparatus 1 may restore a plurality of image frames included in the video data and display the plurality of image frames consecutively. In addition, the display apparatus 1 may restore audio signals included in the audio data and output sound corresponding to the audio signals consecutively.

As shown in FIG. 1, the display apparatus 1 may include a main body 11 and a screen 12 displaying an image I.

The display apparatus 1 may be installed in a standing manner on an indoor or outdoor floor or furniture, or may be installed in a wall-mounted format on a wall or inside a wall. In one or more embodiments, the display apparatus 1 may include support legs 19 provided at the lower portion of the main body 11 for installation in a standing manner on an indoor or outdoor floor or furniture.

The main body 11 may form the exterior of the display apparatus 1. Components for the display apparatus 1 to perform various functions, such as displaying the image I, may be arranged inside the main body 11.

The display apparatus 1 may be configured to display the image I. In particular, the screen 12 may be formed on a front surface of the main body 11, and the display apparatus 1 may display the image I through the screen 12. For example, the screen 12 may display still images or moving images. In addition, the screen 12 may also display a two-dimensional flat image or a three-dimensional stereoscopic image using the parallax of the user's two eyes.

A plurality of pixels P may be formed on the screen 12. The image I displayed on the screen 12 may be formed by the light emitted by each of the plurality of pixels P. For example, the light emitted by the plurality of pixels P may be combined like a mosaic, thereby forming the image I on the screen 12.

Each of the plurality of pixels P may emit light of different brightness and different colors. In particular, each of the plurality of pixels P may include a red sub-pixel PR capable of emitting red light, a green sub-pixel PG capable of emitting green light, and a blue sub-pixel PB capable of emitting blue light. For example, the red light may represent light with a wavelength of about 620 nm (nanometer) to 750 nm, the green light may represent light with a wavelength of about 495 nm to 570 nm, and the blue light may represent light with a wavelength of about 450 nm to 495 nm.

Each of the plurality of pixels P may emit light of different brightness and different color by combining the light emitted from the red sub-pixel PR, the green sub-pixel PG, and the blue sub-pixel PB, respectively.

Figure 2:
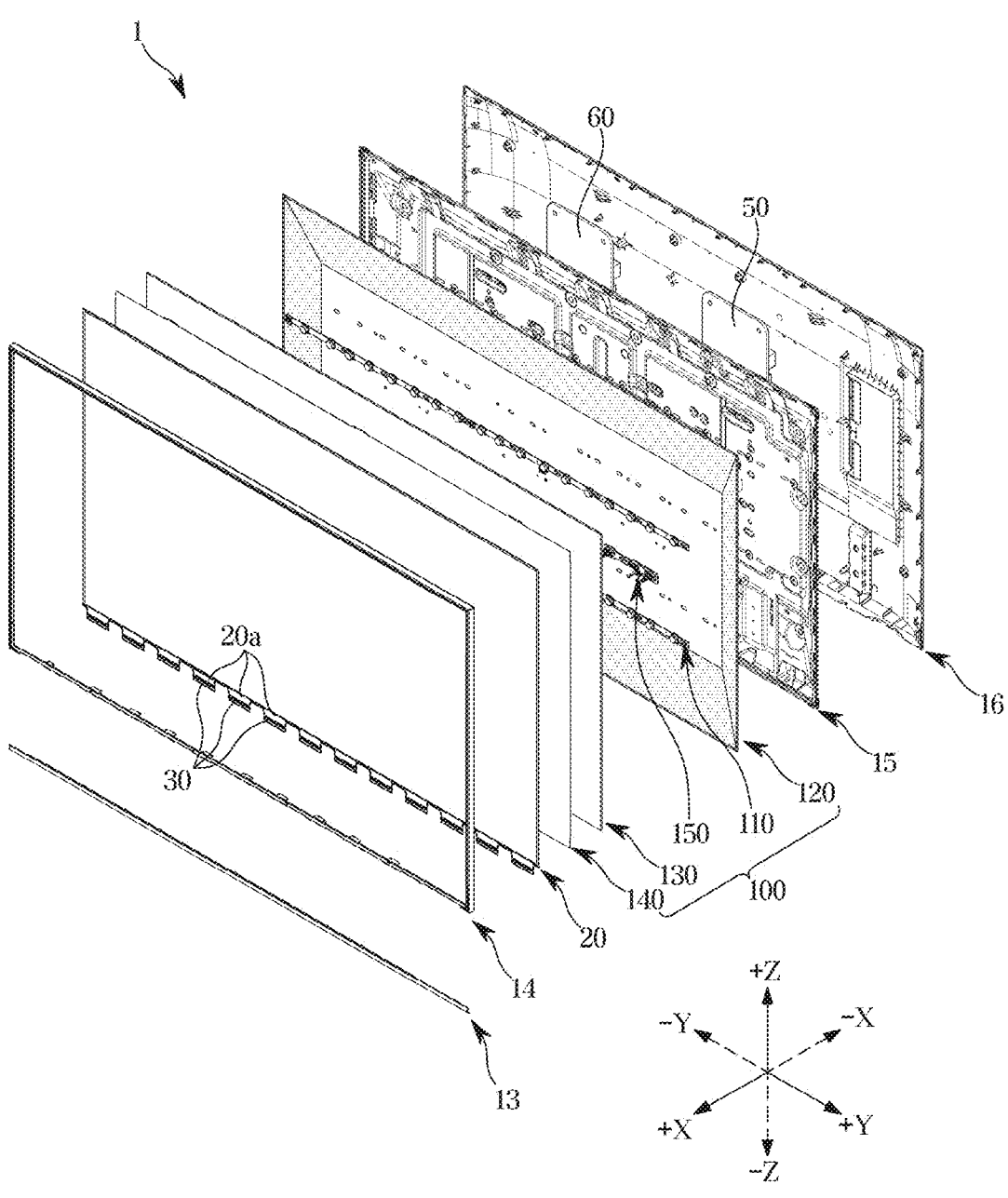
FIG. 2 shows an exploded view of a display apparatus according to one or more embodiments.

FIG. 2 is an exploded view showing the display apparatus according to one or more embodiments.

Referring to FIG. 2, various components for generating the image I on the screen 12 may be arranged within the main body 11 of the display apparatus 1 according to one or more embodiments.

For example, the display apparatus 1 may include a display panel 20. The display panel 20 may be provided within the main body 11. The display panel 20 may be configured to display the image I. The screen 12 described in FIG. 1 may be formed on a front side of the display panel 20.

In one or more embodiments, the display panel 20 may have an approximately rectangular shape. In particular, the display panel 20 may have a shape in which the lengths of the horizontal side and the vertical side differ from each other. In other words, the display panel 20 may be configured to have a long side and a short side. The display panel 20 may be provided in a rectangular plate shape. However, the present disclosure is not limited thereto, and the display panel 20 may be provided in a square plate shape with equal lengths of the long side and the short side.

The display panel 20 may be provided in different sizes. The ratio of the long side and the short side of the display panel 20 may not be limited to common cases, such as 16:9 and 4:3, and may be provided in any ratio.

In the display apparatus 1 according to one or more embodiments, the display panel 20 may be configured as a non-emissive display type panel, such as a liquid crystal display (LCD).

On one side of the display panel 20, a cable 20a configured to transmit image data to the display panel 20, and a display driver integrated circuit (DDI) 30 (hereinafter referred to as "a driver IC") configured to process digital image data and output an analog image signal may be provided.

The cable 20a may electrically connect a control assembly 50 with the driver IC 30 and a power assembly 60 with the driver IC 30. The cable 20a may electrically connect the driver IC 30 with the display panel 20. The cable 20a may include a flexible flat cable or a film cable, which are bendable.

The driver IC 30 may receive image data and power from the control assembly 50 and the power assembly 60 through the cable 20a, and transmit image data and driving current to the display panel 20 through the cable 20a.

In addition, the cable 20a and the driver IC 30 may be integrally implemented by a method, such as a film cable, a chip-on-film (COF), a tape carrier package (TCP), and the like. In other words, the driver IC 30 may be positioned on the cable 20a. However, the present disclosure is not limited thereto, and the driver IC 30 may be positioned on the display panel 20.

A detailed description of a structure of the display panel 20 is provided below.

The display apparatus 1 may include a backlight unit 100 configured to emit light toward the display panel 20. The backlight unit 100 may be provided within the main body 11. The backlight unit 100 may be arranged on a rear side of the display panel 20 to emit light toward a front side on which the display panel 20 is located. The display panel 20 may block or transmit the light emitted by the backlight unit 100.

The backlight unit 100 may include a point light source that emits monochromatic light or white light. The backlight unit 100 may be configured to refract, reflect, and scatter light in order to convert the light emitted from the point light source into uniform surface light. The backlight unit 100 may emit uniform surface light toward the front side by refracting, reflecting, and scattering the light emitted from the point light source.

Referring to FIG. 2, the backlight unit 100 may include a light source module 110. The light source module 110 may generate and emit light. The light source module 110 may be configured to emit monochromatic light or white light.

The light source module 110 may include a plurality of light sources 111 configured to direct light, and a light source substrate 112 on which the plurality of light sources 111 are mounted.

According to one or more embodiments, the light source module 110 may include a bar-type light source substrate 112 extending along one direction. The light source substrate 112 may include the plurality of light sources 111 mounted to be spaced apart from each other along the one direction. The one direction may refer to a left-to-right direction or a horizontal direction or a Y direction.

The light source module 110 may include a plurality of light source substrates 112 spaced apart from each other. The plurality of light source substrates 112 may be spaced apart in an up-and-down direction or a vertical direction, or a Z direction.

Referring to FIG. 2, the backlight unit 100 may include a reflective sheet 120 configured to reflect light. The reflective sheet 120 may reflect light in a forward direction or in a direction proximate to the forward direction. The reflective sheet 120 may be attached or coupled to a rear chassis 15. The method and structure of attaching or coupling the reflective sheet 120 to the rear chassis 15 will be described later.

The light source module 110 may emit light in various directions for a front side of the reflective sheet 120. The light source module 110 may emit light toward a diffuser plate 130, which will be described later, as well as toward the reflective sheet 120. The reflective sheet 120 may reflect light emitted toward the reflective sheet 120 toward the diffuser plate 130.

As light emitted from the light source module 110 passes through various objects, such as the diffuser plate 130 and an optical sheet 140, a portion of the light may be reflected from the surfaces of the diffuser plate 130 and the optical sheet 140, and for this reason, the reflective sheet 120 may reflect the reflected light back to the front side.

Referring to FIG. 2, the backlight unit 100 may include the diffuser plate 130 configured to uniformly diffuse light. The diffuser plate 130 may be arranged on the front side of the light source module 110 and the reflective sheet 120. The diffuser plate 130 may uniformly distribute the light emitted from the light source module 110 and then emit the distributed light forward.

Referring to FIG. 2, the backlight unit 100 may include the optical sheet 140 configured to further improve the luminance of the emitted light and the uniformity of the luminance. The optical sheet 140 may be configured to refract and scatter light emitted from a front side of the diffuser plate 130. For example, the optical sheet 140 may include at least one of various types of sheets, such as a diffusion sheet, a prism sheet, a reflective polarizing sheet, and a quantum dot sheet. In other words, the optical sheet 140 may include a plurality of sheets.

The diffuser plate 130 and the optical sheet 140 may be referred to as optical members 130 and 140.

The display apparatus 1 may include the control assembly 50 that controls the operation of the backlight unit 100 and the display panel 20, and the power assembly 60 that supplies power to the backlight unit 100 and the display panel 20. The control assembly 50 and the power assembly 60 may be provided within the main body 11.

In one or more embodiments, the control assembly 50 may include control circuitry to control operations of the display panel 20 and the backlight unit 100. The control circuitry may process image data received from an external content source, transmit the image data to the display panel 20, and transmit dimming data to the backlight unit 100.

In one or more embodiments, the power assembly 60 may provide power to the display panel 20 and the backlight unit 100 such that the backlight unit 100 may output light and the display panel 20 may block or transmit light from the backlight unit 100.

The control assembly 50 and the power assembly 60 may be implemented as a printed circuit board and various circuits mounted on the printed circuit board. For example, power circuitry may include capacitors, coils, resistors, processors, and the like, and the power circuit board on which they are mounted. In addition, the control circuitry may include a memory, a processor, and a control circuit board on which they are mounted.

Referring to FIG. 2, the display apparatus 1 may include the rear chassis 15. The rear chassis 15 may cover the rear side of the display panel 20. The rear chassis 15 may support various components of the display apparatus 1, such as the backlight unit 100, the control assembly 50, and the power assembly 60.

The rear chassis 15 may be formed to have a substantially flat plate shape, but is not limited thereto. The rear chassis 15 may be configured to include a material having a high thermal conductivity so as to dissipate heat generated from the light source module 110 to the outside. In one or more embodiments, the rear chassis 15 may be configured to include a metallic material, such as aluminum or stainless steel (SUS), or a plastic material, such as acrylonitrile butadiene styrene copolymer (ABS).

The display apparatus 1 may include a middle mold 14. The middle mold 14 may be provided in a substantially rectangular frame shape. The middle mold 14 may be arranged on a front side of the rear chassis 15. The middle mold 14 may support at least some configurations of the backlight unit 100. The middle mold 14 may be configured to support a side face of the display panel 20.

Referring to FIG. 2, the display apparatus 1 may include a bottom cover 13. The bottom cover 13 may be coupled to the middle mold 14 to cover a lower surface of the middle mold 14. The bottom cover 13 may prevent the lower surface of the middle mold 14 from being exposed to the outside of the display apparatus 1. The bottom cover 13 may form the lower surface of the display apparatus 1.

The display apparatus 1 may include a rear cover 16. The rear cover 16 may be arranged on the rear side of the rear chassis 15. The rear cover 16 may cover the rear chassis 15 and various configurations mounted on the rear side of the rear chassis 15 (e.g., the control assembly 50, the power assembly 60, etc.). The rear cover 16 may prevent the rear chassis 15 and various configurations mounted on the rear side of the rear chassis 15 from being exposed to the rear of the display apparatus 1. The rear cover 16 may form a rear surface of the display apparatus 1.

The configurations of the display apparatus 1 described above with reference to FIG. 2 are only an example for explaining the display apparatus according to the present disclosure, and the present disclosure is not limited thereto. The display apparatus according to the present disclosure may be configured to include various configurations for performing a function of providing an image on a screen.

Figure 3:
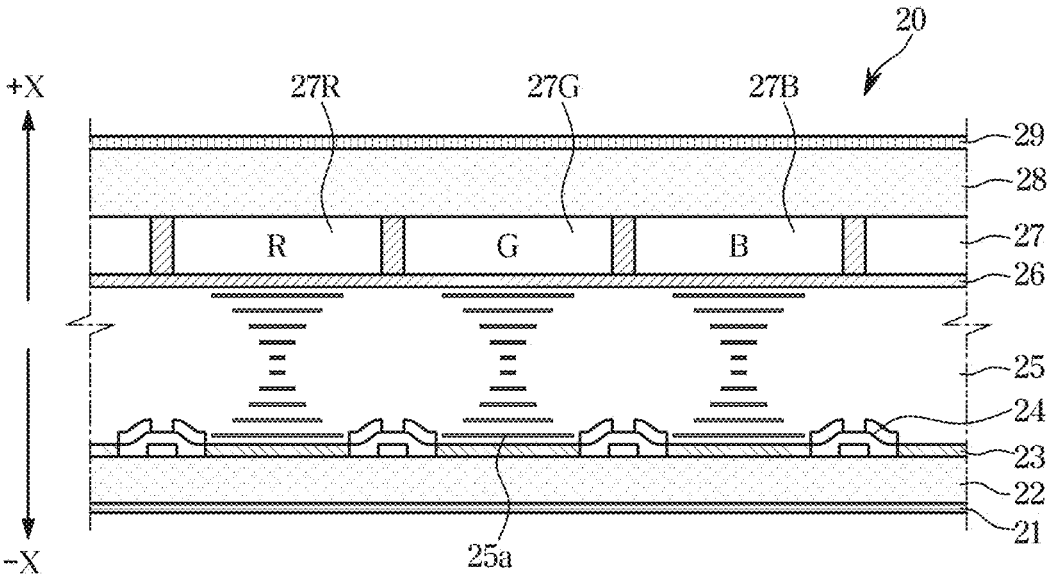
FIG. 3 shows an enlarged cross-section of a portion of a display module in the display apparatus according to one or more embodiments.

FIG. 3 is an enlarged cross-section of a portion of a display module in the display apparatus according to one or more embodiments.

Referring to FIG. 3, the display panel 20 of the display apparatus 1 according to one or more embodiments may be configured as an LCD panel. The display panel 20 may be configured to block or transmit light emitted from the backlight unit 100. By allowing the display panel 20 to block or pass light emitted from the backlight unit 100, the image I may be formed on a front surface of the display panel 20.

The front surface of the display panel 20 may form the screen 12 of the display apparatus 1 described above. The display panel 20 may be provided with the plurality of pixels P. The plurality of pixels P on the display panel 20 may each independently block or transmit light from the backlight unit 100, and the light transmitted by the plurality of pixels P may form the image I displayed on the screen 12.

For example, as shown in FIG. 3, the display panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be configured as tempered glass or transparent resin.

The first polarizing film 21 and the second polarizing film 29 may be arranged on outer sides of the first and second transparent substrates 22 and 28, respectively.

The first polarizing film 21 and the second polarizing film 29 may each allow certain light to pass through and block other light. For example, the first polarizing film 21 may allow light having a magnetic field oscillating in a first direction to pass through and block other light. In addition, the second polarizing film 29 may allow light having a magnetic field oscillating in a second direction to pass through and block other light. At this time, the first direction and the second direction may be orthogonal to each other. As a result, the polarization direction of the light passed through the first polarizing film 21 and the oscillation direction of the light passed through the second polarizing film 29 may be orthogonal to each other. As a result, light may generally not pass through the first polarizing film 21 and the second polarizing film 29 simultaneously.

The color filter 27 may be arranged on the inner side of the second transparent substrate 28.

The color filter 27 may include, for example, a red filter 27R that transmits red light, a green filter 27G that transmits green light, and a blue filter 27B that transmits blue light, and the red filter 27R, the green filter 27G, and the blue filter 27B may be arranged in a row with each other. A region in which the color filter 27 is formed may correspond to the pixel P described above. A region in which the red filter 27R is formed may correspond to the red sub-pixel PR, a region in which the green filter 27G is formed may correspond to the green sub-pixel PG, and a region in which the blue filter 27B is formed may correspond to the blue sub-pixel PB.

The pixel electrode 23 may be arranged on the inner side of the first transparent substrate 22, and the common electrode 26 may be arranged on the inner side of the second transparent substrate 28.

The pixel electrode 23 and the common electrode 26 may be configured of an electrically conductive metallic material, and may generate an electric field for changing the arrangement of liquid crystal molecules 25a constituting the liquid crystal layer 25, which will be described below.

The pixel electrode 23 and the common electrode 26 may be configured of a transparent material, and may allow light incident from the outside to be transmitted. For example, the pixel electrode 23 and the common electrode 26 may be configured as, such as indium tin oxide (ITO), indium zinc oxide (IZO), silver nanowires, carbon nanotubes (CNT), graphene, 3,4-ethylenedioxythiophene (PEDOT), or the like. The thin film transistor (TFT) 24 may be arranged on the inner side of the first transparent substrate 22.

The TFT 24 may pass or block the current flowing through the pixel electrode 23. For example, an electric field may be formed or removed between the pixel electrode 23 and the common electrode 26 in response to the turning-on (closing) or turning-off (opening) of the TFT 24.

The TFT 24 may be configured of poly-silicon and may be formed by a semiconductor process, such as a lithography, deposition, or ion implantation.

The liquid crystal layer 25 may be formed between the pixel electrode 23 and the common electrode 26. The liquid crystal layer 25 may be filled with the liquid crystal molecules 25a.

Liquid crystals represent an intermediate state between a solid (crystal) and a liquid. Most liquid crystal materials are organic compounds, and their molecular shapes are thin and elongated rod shapes, where the arrangement of the molecules is irregular in some directions, but may have the shape of a regular crystal in other directions. As a result, liquid crystals may have both the fluidity of a liquid and the optical anisotropy of a crystal (solid).

In addition, liquid crystals may exhibit optical properties in response to changes in the electric field. For example, liquid crystals may change the direction of the arrangement of molecules constituting the liquid crystal in response to changes in the electric field. When an electric field is generated in the liquid crystal layer 25, the liquid crystal molecules 25a of the liquid crystal layer 25 may be arranged in accordance with the direction of the electric field, and when an electric field is not generated in the liquid crystal layer 25, the liquid crystal molecules 25a may be arranged irregularly or along an alignment film. As a result, the optical properties of the liquid crystal layer 25 may vary depending on the presence or absence of an electric field passing through the liquid crystal layer 25.

The structure of the display panel 20 described above with reference to FIG. 3 is only one example of a structure that the display panel of the display apparatus according to the present disclosure may have, and the present disclosure is not limited thereto.

Figure 4:
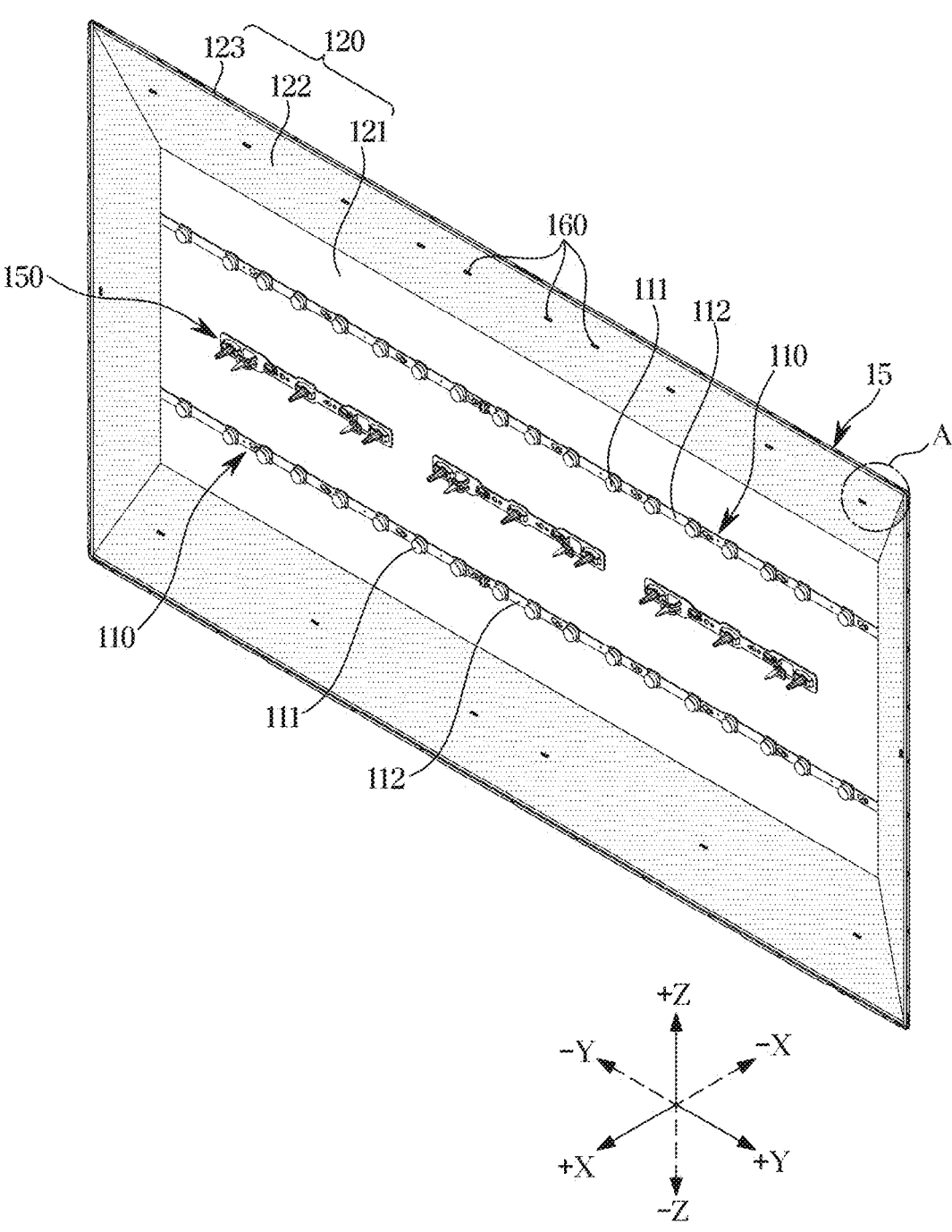
FIG. 4 shows a portion of the display apparatus according to one or more embodiments.
Figure 5:
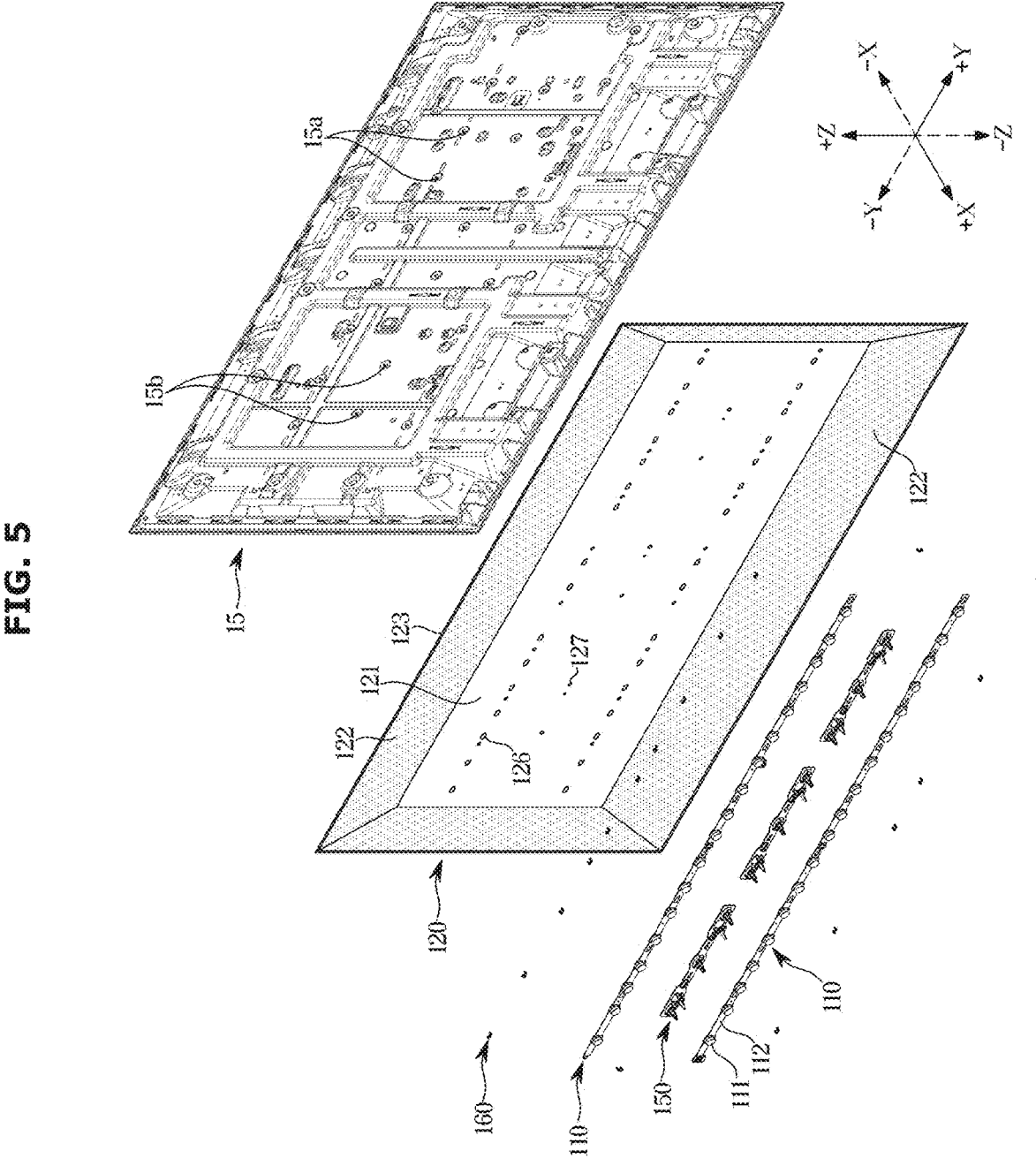
FIG. 5 shows a disassembled portion of the display apparatus shown in FIG. 4.

FIG. 4 is a view showing a portion of the display apparatus according to one or more embodiments. FIG. 5 is an exploded view showing a portion of the display apparatus shown in FIG. 4.

Referring to FIGS. 4 and 5, the display apparatus 1 according to one or more embodiments may include the reflective sheet 120 and the light source module 110 disposed on the reflective sheet 120. The light source module 110 may be positioned on the front side of the reflective sheet 120.

The display apparatus 1 according to one or more embodiments may be arranged such that the reflective sheet 120 is disposed on the front side of the rear chassis 15 and the light source module 110 is disposed on the front side of the reflective sheet 120.

The light source module 110 of the display apparatus 1 may include the light source substrate 112 disposed on the front side of the reflective sheet 120. The light source substrate 112 of the light source module 110 may be positioned on the front side of the reflective sheet 120.

The light source module 110 of the display apparatus 1 may include the plurality of light sources 111 mounted on the light source substrate 112. As described above, the light source substrate 112 may have a bar shape extending in the left-to-right direction. The plurality of light sources 111 may be arranged to be spaced apart from each other in the left-to-right direction on the light source substrate 112.

The reflective sheet 120 may be positioned on the rear side of the light source module 110. The reflective sheet 120 may include a seating portion 121 on which the light source module 110 is seated, and an inclined portion 122 arranged along an edge of the seating portion 121.

The inclined portion 122 may be arranged to be inclined with respect to the seating portion 121. The inclined portion 122 may be inclined with respect to the seating portion 121 such that the reflective sheet 120 may correspond to the shape of the rear chassis 15. The inclined portion 122 may be inclined with respect to the seating portion 121 so as to protrude forwardly from the seating portion 121. In order for the rear chassis 15 to receive the light source module 110, a portion of the front surface of the rear chassis 15 may be recessed rearwardly (put another way, a front surface of the rear chassis may have a generally concave shape). To correspond to the shape of the rear chassis 15, the reflective sheet 120 may include the seating portion 121 corresponding to the recessed portion of the rear chassis 15 and the inclined portion 122 arranged to be inclined with respect to the seating portion 121.

The inclined portion 122 of the reflective sheet 120 may be configured to reduce luminance. Since the inclined portion 122 has a shape that protrudes forward from the seating portion 121, the luminance at the inclined portion 122 may be higher than the luminance at the seating portion 121. In the display apparatus 1 according to one or more embodiments, the reflective sheet 120 may include a configuration or structure for reducing the luminance at the inclined portion 122 in order to achieve uniformity of luminance. For example, the inclined portion 122 may be configured such that a dark color such as black or a similar color ink is applied to the inclined portion 122 to reduce the luminance of the inclined portion 122.

According to one or more embodiments, the reflective sheet 120 may further include an outer portion 123 formed along an edge of the inclined portion 122 and arranged to contact an edge of the rear chassis 15. The outer portion 123 may be arranged approximately parallel to the seating portion 121. The outer portion 123 may refer to a rectangular frame-shaped region forming an edge of the reflective sheet 120.

The display apparatus 1 according to one or more embodiments may include a supporter 150 for maintaining a distance between the plurality of light sources 111 of the light source module 110 and the optical members 130 and 140. The supporter 150 may be positioned on the reflective sheet 120. The supporter 150 may be arranged between the reflective sheet 120 and the optical members 130 and 140. The supporter 150 may support components positioned on the front side of the light source module 110. In one or more embodiments, the supporter 150 may support the diffuser plate 130 and/or the optical sheet 140.

The supporter 150 may maintain the optical properties of the display apparatus 1 by maintaining an optical distance OD between the plurality of light sources 111 of the light source module 110 and the optical members 130 and 140. To this end, the supporter 150 may be configured to have a thickness corresponding to the OD over which the backlight unit 100 may maintain the optical properties. The thickness of the supporter 150 may refer to a length in the front-to-back direction or the X direction of the supporter 150.

Referring to FIGS. 4 and 5, the light source module 110 of the display apparatus 1 according to one or more embodiments may be mounted to the rear chassis 15. The light source substrate 112 of the light source module 110 may be detachably mounted to the rear chassis 15.

The rear chassis 15 may include a module mounting portion 15a for mounting the light source module 110. The module mounting portion 15a may protrude forwardly from the front surface of the rear chassis 15.

The reflective sheet 120 of the display apparatus 1 may be received in the rear chassis 15. The reflective sheet 120 may include a first opening 126 formed such that the module mounting portion 15a of the rear chassis 15 may pass through the first opening 126. The first opening 126 may be formed through the reflective sheet 120. Based on the reflective sheet 120 being mounted to the rear chassis 15, the module mounting portion 15a may pass through the first opening 126 and protrude forward from the reflective sheet 120. The module mounting portion 15a may pass through the first opening 126 to be coupled with the light source substrate 112.

Referring to FIG. 5, the rear chassis 15 may include a supporter mounting portion 15b so that the supporter 150 may be mounted to the rear chassis 15. The supporter mounting portion 15b may protrude forward from the front surface of the rear chassis 15.

Referring to FIG. 5, the reflective sheet 120 may include a second opening 127 formed such that the supporter mounting portion 15*b* of the rear chassis 15 may pass through the second opening 127. The second opening 127 may be formed through the reflective sheet 120. Based on the reflective sheet 120 being mounted to the rear chassis 15, the supporter mounting portion 15*b* may pass through the second opening 127 and protrude forward from the reflective sheet 120.

Figure 6:
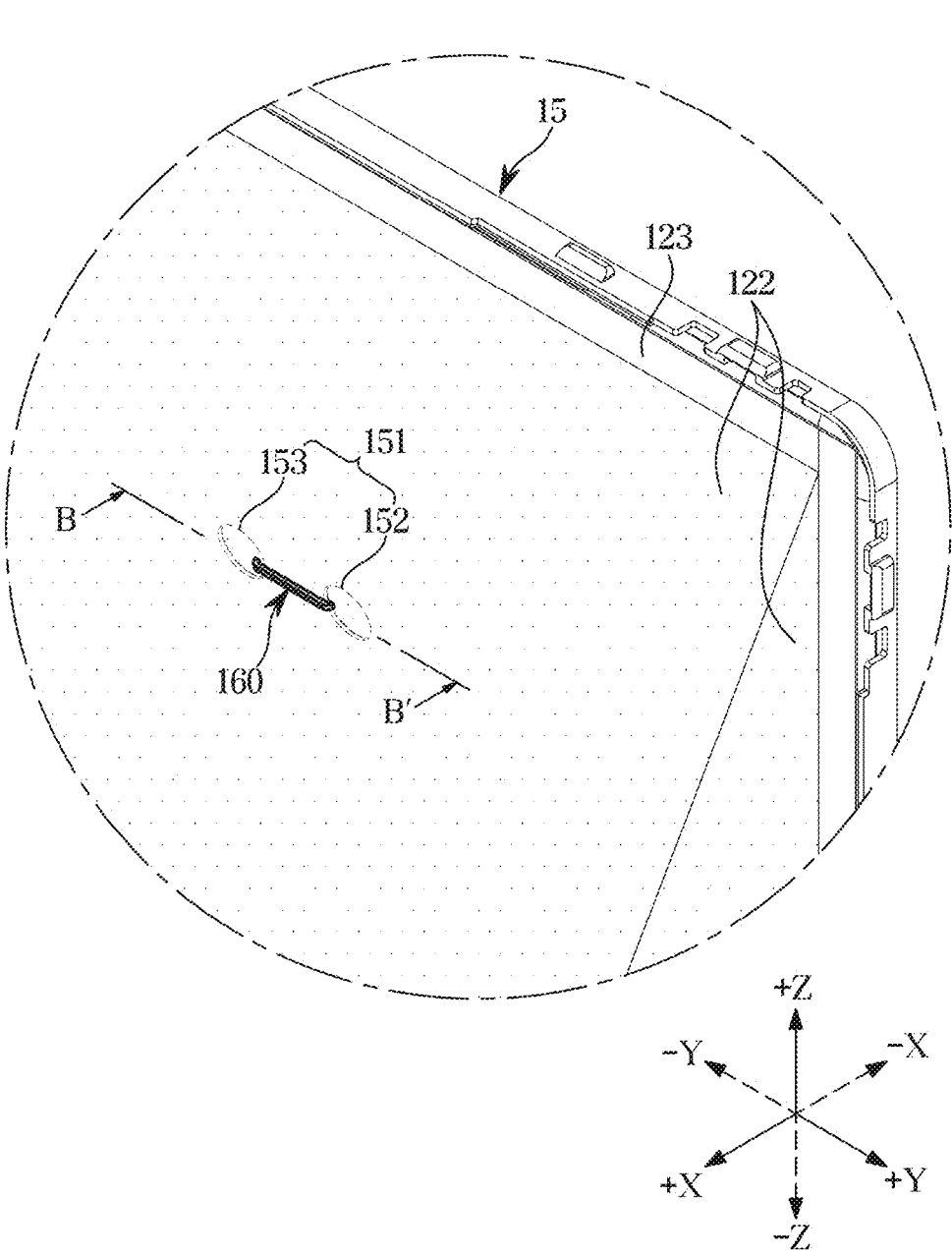
FIG. 6 shows an enlarged view of area A of FIG. 4.
Figure 7:
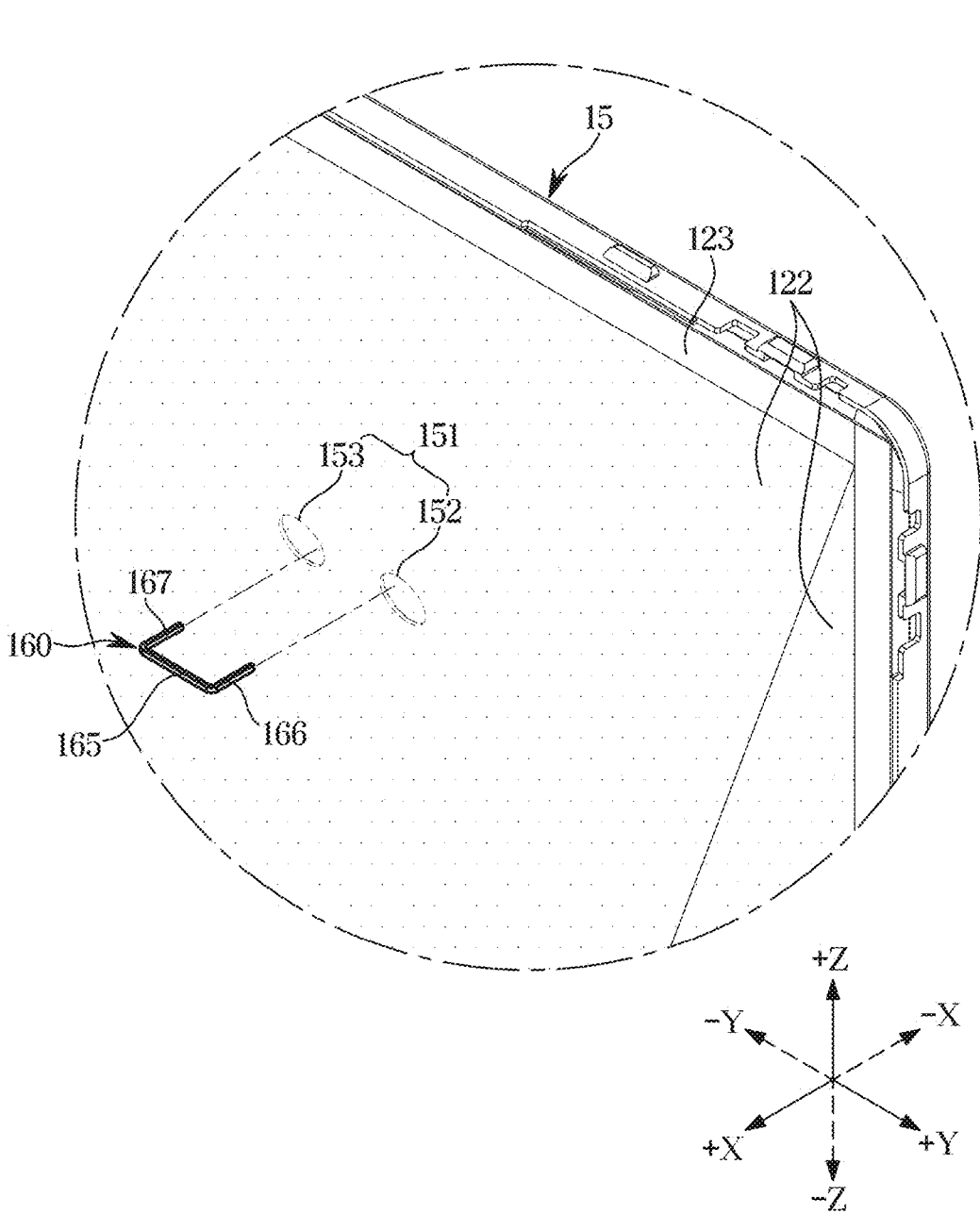
FIG. 7 is an enlarged view of area A of FIG. 4, showing a state before a fastening member secures a reflective sheet to a rear chassis.
Figure 8:
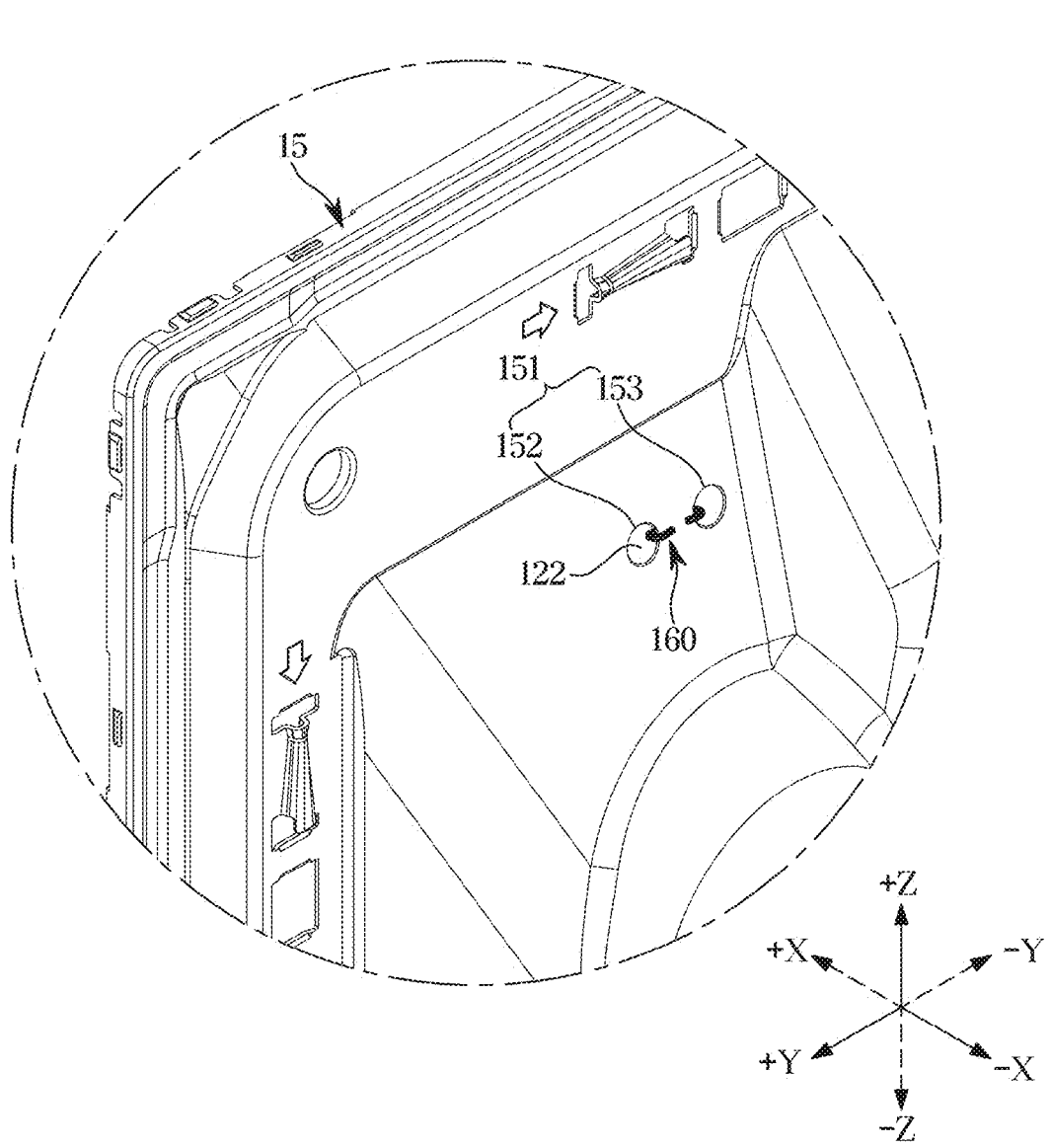
FIG. 8 shows a rear, perspective view of the area shown in FIG. 6.
Figure 9:
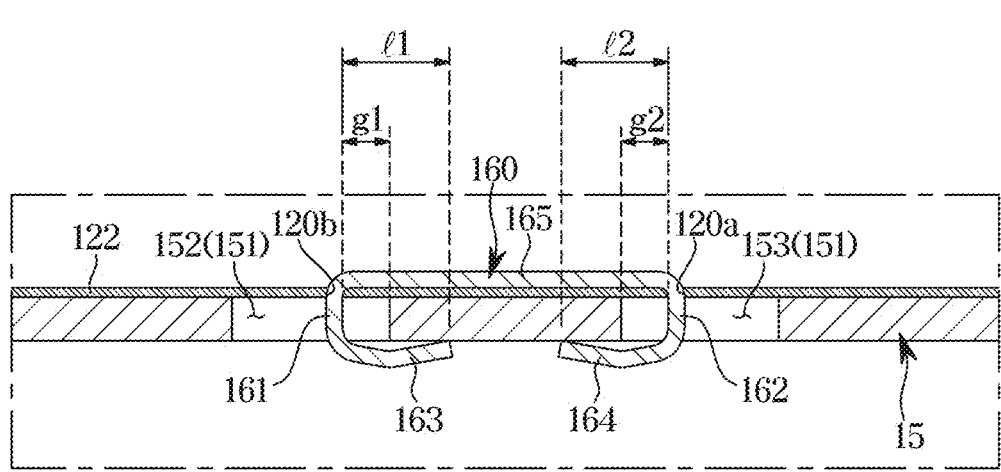
FIG. 9 shows a cross-section taken along line B-B' of FIG. 6.
Figure 9:
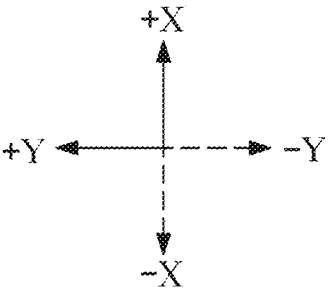

FIG. 6 is an enlarged view of area A of FIG. 4. FIG. 7 is an enlarged view of area A of FIG. 4, showing a state before a fastening member secures the reflective sheet to the rear chassis. FIG. 8 is a rear, perspective view of the area shown in FIG. 6. FIG. 9 is a cross-section taken along line B-B' of FIG. 6.

Referring to FIG. 6, the display apparatus 1 according to the present disclosure may include the rear chassis 15 having a fixing hole 151, and a fastening member 160 (e.g., a fastener) configured to secure the reflective sheet 120 to the rear chassis 15.

The fixing hole 151 may be formed through the rear chassis 15. The fixing hole 151 may include a first fixing hole 152 and a second fixing hole 153 formed to be spaced apart from the first fixing hole 152. The first fixing hole 152 and the second fixing hole 153 may be spaced apart by a given distance in the left-to-right direction or in the horizontal direction or in the Y direction.

The rear chassis 15 may include a plurality of fixing holes, such as a pair of fixing holes 151 spaced apart from each other as a unit, such as the first fixing hole 152 and the second fixing hole 153. In other words, the rear chassis 15 may include the plurality of pairs of fixing holes 151.

Referring to FIGS. 4 and 6, in the display apparatus 1 according to one or more embodiments, the plurality of pairs of fixing holes 151 may be formed at positions corresponding to the inclined portion 122 of the reflective sheet 120.

Referring to FIGS. 6 to 8, the fixing hole 151 may be formed in a circle shape, but is not limited thereto. The fixing hole 151 may be formed in a square shape or may have various shapes, such as a polygon or an ellipse.

The display apparatus 1 may include the fastening member 160 configured to secure the reflective sheet 120 to the rear chassis 15. The fastening member 160 may be arranged to penetrate the reflective sheet 120 and then be coupled to the rear chassis 15. As the fastening member 160 penetrates the reflective sheet 120, a through hole may be formed in the reflective sheet 120 into which at least a portion of the fastening member 160 is inserted.

Referring to FIG. 6, FIG. 8, and FIG. 9, the fastening member 160 may include an insertion portion configured to penetrate the reflective sheet 120 and be inserted into the fixing hole 151, and a bending portion bent at an end of the insertion portion. The bending portion may be arranged to not pass through the fixing hole 151, thereby preventing the insertion portion inserted into the fixing hole 151 from being withdrawn from the fixing hole 151.

Specifically, the fastening member 160 may include a first insertion portion 161 arranged to penetrate the inclined portion 122 of the reflective sheet 120 and be inserted into the first fixing hole 152 of the rear chassis 15, and a second insertion portion 162 arranged to penetrate the inclined portion 122 of the reflective sheet 120 and be inserted into the second fixing hole 153 of the rear chassis 15. The first insertion portion 161 and the second insertion portion 162 may extend approximately in the front-to-back direction or in the X direction.

Referring to FIG. 9, as the fastening member 160 penetrates the reflective sheet 120, a first through hole 120*b* into which the first insertion portion 161 is inserted may be formed in the reflective sheet 120. As the fastening member 160 penetrates the reflective sheet 120, a second through hole 120*a* into which the second insertion portion 162 is inserted may be formed in the reflective sheet 120.

The fastening member 160 may include a first bending portion 163 bent at one end (i.e., a first end) of the first insertion portion 161 and a second bending portion 164 bent at one end (i.e., a first end) of the second insertion portion 162. The first bending portion 163 may be bent toward the second fixing hole 153. The second bending portion 164 may be bent toward the first fixing hole 152. In other words, the first bending portion 163 and the second bending portion 164 may be in a direction that brings them closer to each other.

The fastening member 160 may include a connecting portion 165 connecting the other end (i.e., the second end) of the first insertion portion 161 and the other end (i.e., the second end) of the second insertion portion 162. The connecting portion 165 may extend approximately in the left-to-right direction or in the horizontal direction or in the Y direction.

Referring to FIGS. 6 and 8, the connecting portion 165 of the fastening member 160 may be positioned on the front side of the reflective sheet 120. The first bending portion 163 and the second bending portion 164 may be positioned on the rear side of the reflective sheet 120 and the rear chassis 15. The connecting portion 165 may be positioned on the front side of the reflective sheet 120, so that the reflective sheet 120 may have more uniform luminance. In order for the connecting portion 165 to be positioned on the front side of the reflective sheet 120, the fastening member 160 may be coupled to the rear chassis 15 in front of the reflective sheet 120, as will be described later.

Referring to FIG. 9, a predetermined first gap g1 may be formed between the first insertion portion 161 and an inner edge of the first fixing hole 152. A predetermined second gap g2 may be formed between the second insertion portion 162 and an inner edge of the second fixing hole 153. In FIG. 9, the first gap g1 and the second gap g2 are formed substantially the same, but are not limited thereto. The first gap g1 may be larger than the second gap g2 or smaller than the second gap g2. In other words, the first gap g1 and the second gap g2 may be formed differently.

Referring to FIG. 9, a length 11 along which the first bending portion 163 extends from one end of the first insertion portion 161 may be set to be greater than the first gap g1. A length 12 along which the second bending portion 164 extends from one end of the second insertion portion 162 may be set to be greater than the second gap g2. The length 11 along which the first bending portion 163 extends and the length 12 along which the second bending portion 164 extends may be set to be substantially the same. The length 11 along which the first bending portion 163 extends may be set to be greater than the sum of the first gap g1 and the second gap g2. Similarly, the length 12 along which the second bending portion 164 extends may be set to be greater than the sum of the first gap g1 and the second gap g2.

Upon contraction and expansion of the reflective sheet 120, the fastening member 160 may move in an up, down, left, or right direction within a predetermined range due to the contraction and expansion of the reflective sheet 120. In particular, the first insertion portion 161 of the fastening member 160 may move within the first fixing hole 152, and the second insertion portion 162 of the fastening member 160 may move within the second fixing hole 153.

In the process in which the fastening member 160 moves due to the contraction and expansion of the reflective sheet 120, the first insertion portion 161 may contact one side of the first fixing hole 152 or the second insertion portion 162 may contact one side of the second fixing hole 153. In this case, a size of one of the first gap g1 and the second gap g2 may be zero, and a size of the other of the first gap g1 and the second gap g2 may be g1+g2. As described above, the length l1 along which the first bending portion 163 extends may be set to be greater than g1+g2, so that the first bending portion 163 may not be removed from the first fixing hole 152 even though the size of the first gap g1 becomes g1+g2 in response to contacting the second insertion portion 162 with one side of the second fixing hole 153. Similarly, the length l2 along which the second bending portion 164 extends may be set to be greater than g1+g2, consequently the second bending portion 164 may not be removed from the second fixing hole 153 even though the size of the second gap g2 becomes g1+g2 in response to contacting the first insertion portion 161 with one side of the second fixing hole 153.

According to the present disclosure, in response to the reflective sheet 120 being secured to the rear chassis 15 by the fastening member 160, which penetrates the reflective sheet 120 and is coupled to the rear chassis 15, the reflective sheet 120 may be arranged to be movable within a range in which the fastening member 160 may be movable. By having the reflective sheet 120 movably arranged within a predetermined range instead of being fixed in one position, the reflective sheet 120 may be prevented from wrinkling due to contraction and expansion of the reflective sheet 120. In other words, the phenomenon of a sheet wrinkling due to contraction and expansion of the reflective sheet 120 may be prevented.

Referring to FIG. 7, the fastening member 160 prior to penetrating the reflective sheet 120 and being coupled to the rear chassis 15 may include the connecting portion 165, a third bending portion 166 formed by bending one end of the connecting portion 165 forward, and a fourth bending portion 167 formed by bending the other end of the connecting portion 165 forward.

The fastening member 160 may be coupled to the rear chassis 15 by having the third bending portion 166 and the fourth bending portion 167 each penetrate the inclined portion 122 of the reflective sheet 120, and then bending the third bending portion 166 and the fourth bending portion 167, respectively, in a direction to bring them closer to each other. This may be the same as, or similar to, a widely known stapling method.

According to the present disclosure, the reflective sheet 120 may be secured to the rear chassis 15 by the fastening member 160 having substantially the same structure as a commercially available staple. After providing a jig having the same or similar structure as a staple gun arranged to automatically fire a staple, the reflective sheet 120 may be secured to the rear chassis 15 by firing the fastening member 160 toward the reflective sheet 120 from the jig. According to the present disclosure, automation for securing the reflective sheet 120 to the rear chassis 15 may be facilitated, so that assembly and productivity may be improved and the display apparatus 1 may be provided with uniform quality.

Figure 10:
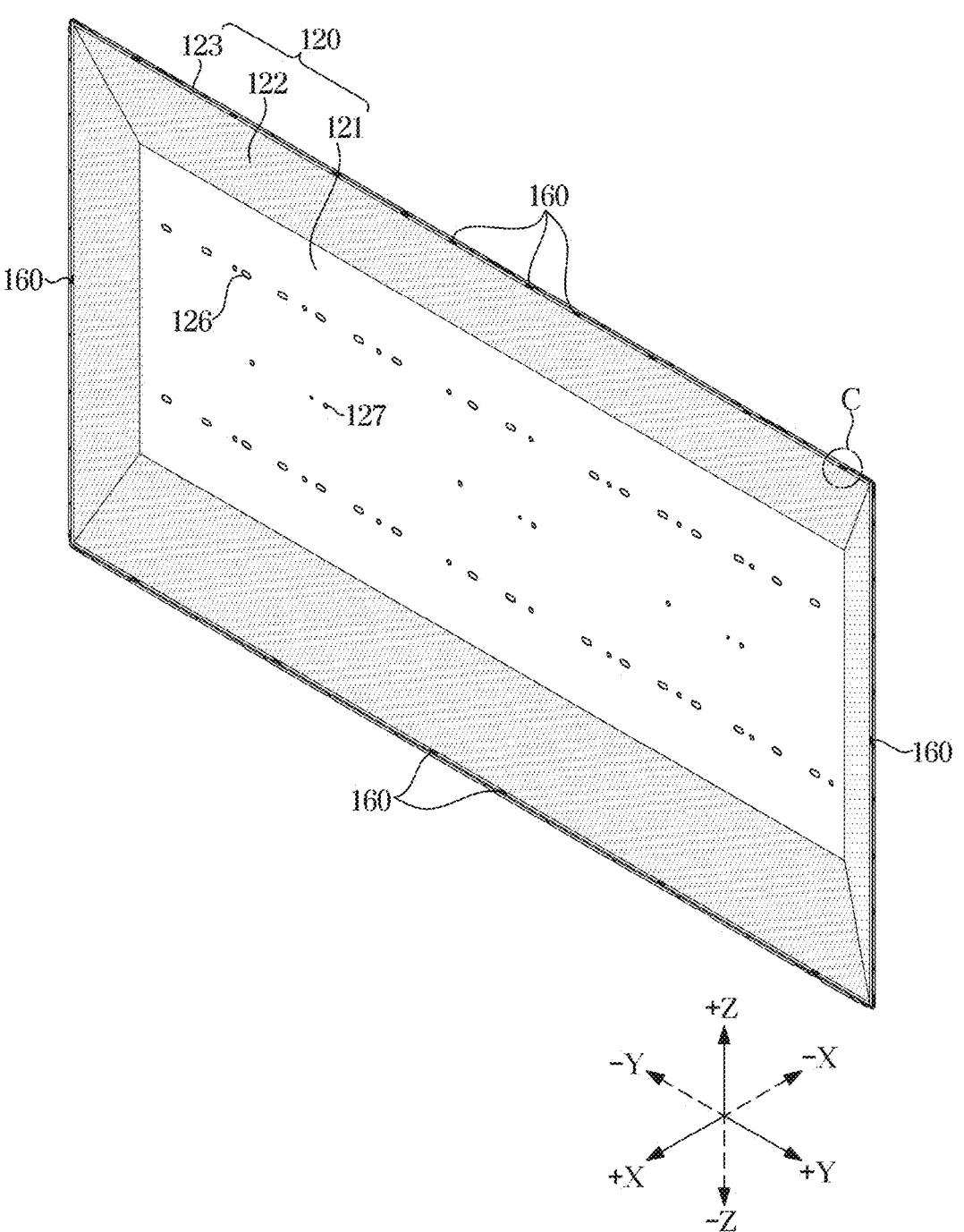
FIG. 10 shows the rear chassis and the reflective sheet secured to the rear chassis in the display apparatus according to one or more embodiments.
Figure 11:
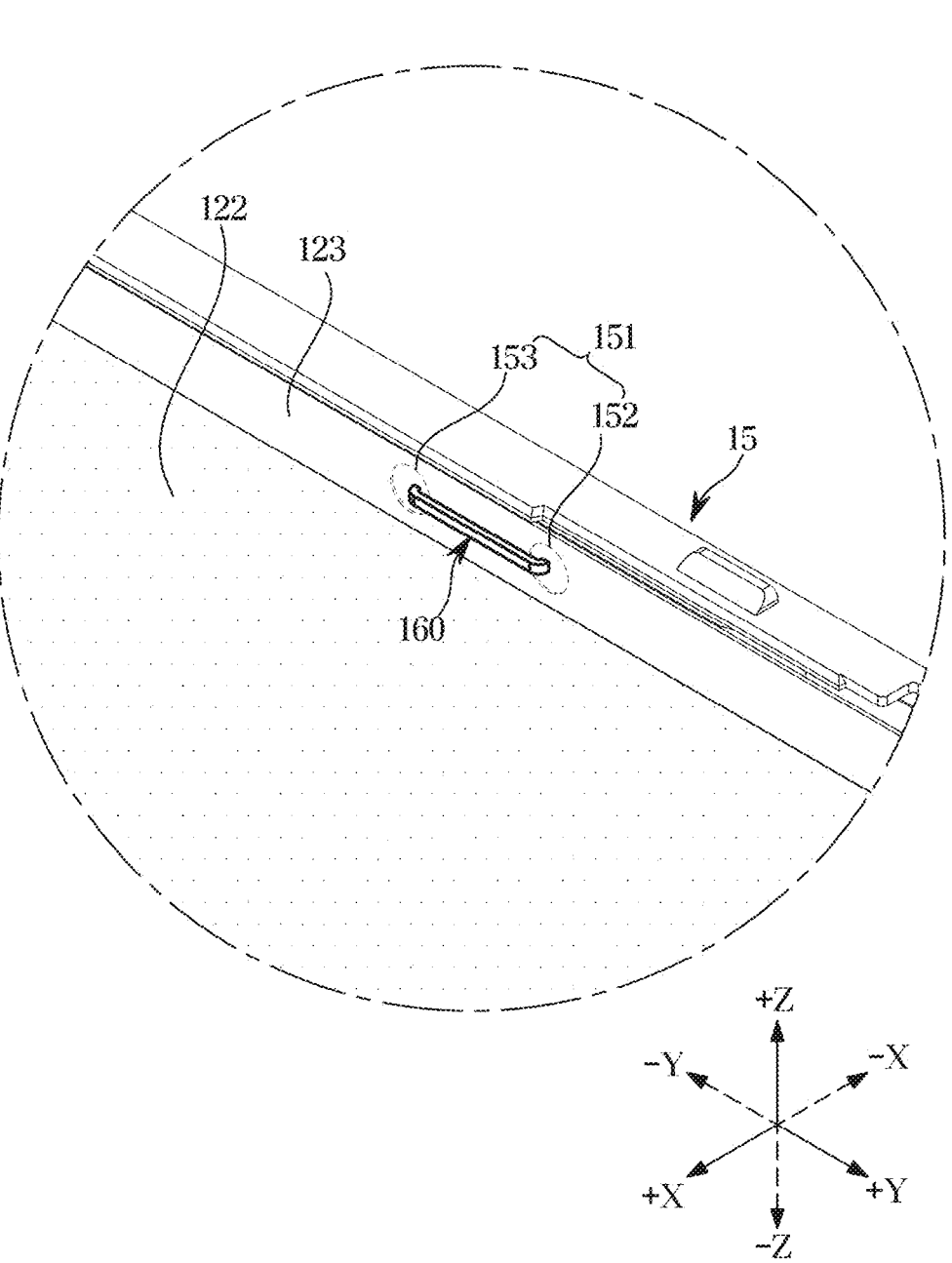
FIG. 11 shows an enlarged view of area C of FIG. 10.

FIG. 10 is a view showing the rear chassis and the reflective sheet secured to the rear chassis in the display apparatus according to one or more embodiments. FIG. 11 is an enlarged view of area C in FIG. 10.

Referring to FIGS. 10 and 11, in the display apparatus 1 according to one or more embodiments, the fixing hole 151 of the rear chassis 15 may be formed at a position corresponding to the outer portion 123 of the reflective sheet 120.

The rear chassis 15 may include a plurality of fixing holes, such as a pair of fixing holes 151 spaced apart from each other as a unit, such as the first fixing hole 152 and the second fixing hole 153. The rear chassis 15 may include a plurality of pairs of fixing holes 151. The plurality of pairs of fixing holes 151 may be formed through the rear chassis 15. The plurality of pairs of fixing holes 151 may be formed at positions corresponding to the outer portions 123 of the reflective sheet 120 seated on the rear chassis 15.

The fastening member 160 may be coupled to the rear chassis 15 after penetrating the outer portion 123 of the reflective sheet 120. The structure and method by which the fastening member 160 penetrates the reflective sheet 120 and is coupled to the rear chassis 15 may be the same as described above, and thus redundant description is omitted.

According to one or more embodiments, a portion of the plurality of fixing holes of the rear chassis 15 may be formed at a position corresponding to the inclined portion 122 of the reflective sheet 120, and a remaining portion of the plurality of fixing holes may be formed at a position corresponding to the outer portion 123 of the reflective sheet 120. In this case, a portion of the plurality of fastening members 160 may be coupled to the rear chassis 15 by penetrating the inclined portion 122 of the reflective sheet 120, and a remaining portion of the plurality of fastening members 160 may be coupled to the rear chassis 15 by penetrating the outer portion 123 of the reflective sheet 120.

A display apparatus according to one or more embodiments may include a display panel, a reflective sheet arranged on a rear side of the display panel to reflect light, a rear chassis configured to support the reflective sheet on a rear side of the reflective sheet and having a fixing hole, and a fastening member configured to secure the reflective sheet to the rear chassis. The fastening member may include an insertion portion configured to penetrate the reflective sheet and be inserted into the fixing hole, and a bending portion bent at an end of the insertion portion to prevent the insertion portion from being withdrawn from the fixing hole.

The reflective sheet may include a through hole into which the insertion portion is inserted.

The through hole may be formed by the insertion portion penetrating the reflective sheet.

The fixing hole may include a first fixing hole and a second fixing hole formed to be spaced apart from the first fixing hole.

The fastening member may include a first insertion portion configured to penetrate the reflective sheet and be inserted into the first fixing hole, a second insertion portion configured to penetrate the reflective sheet and be inserted into the second fixing hole, a first bending portion bent at one end of the first insertion portion, and a second bending portion bent at one end of the second insertion portion.

The first bending portion may be bent toward the second fixing hole.

The second bending portion may be bent toward the first fixing hole.

The fastening member may further include a connecting portion connecting the other end of the first insertion portion and the other end of the second insertion portion.

The connecting portion may be arranged on a front side of the reflective sheet.

The first bending portion and the second bending portion may be arranged on the rear side of the reflective sheet and the rear chassis.

A predetermined first gap may be formed between the first insertion portion and an inner edge of the first fixing hole.

A predetermined second gap may be formed between the second insertion portion and an inner edge of the second fixing hole.

A length by which the first bending portion extends may be greater than the first gap.

A length by which the second bending portion extends may be greater than the second gap.

The display apparatus may further include a light source module configured to supply light to the display panel from the rear side of the display panel.

The reflective sheet may include a seating portion configured to seat the light source module thereon, and an inclined portion configured to be inclined forwardly from the seating portion along an edge of the seating portion.

The fixing hole may be formed at a position corresponding to the inclined portion.

The reflective sheet may further include an outer portion formed along an edge of the inclined portion and configured to contact an edge of the rear chassis.

The fixing hole may be formed at a position corresponding to the outer portion.

The inclined portion may be formed to be darker than the seating portion to allow the luminance at the inclined portion to be lower than the luminance at the seating portion.

The display apparatus may further include an optical member arranged between the display panel and the reflective sheet, and a supporter arranged on the reflective sheet and configured to support the optical member.

The fastening member may be configured to include at least one of stainless steel and paper.

The reflective sheet may be configured such that the insertion portion is movably arranged within the fixing hole, thereby being movably arranged within a predetermined range relative to the rear chassis.

A display apparatus according to one or more embodiments may include a display panel, a light source module configured to supply light to the display panel, a reflective sheet arranged on a rear side of the display panel and the light source module to reflect light, a rear chassis configured to support the reflective sheet and the light source module at a rear side of the reflective sheet and having a first fixing hole and a second fixing hole, and a fastening member configured to secure the reflective sheet to the rear chassis. The fastening member may include a first insertion portion configured to penetrate the reflective sheet and be inserted into the first fixing hole, a second insertion portion configured to penetrate the reflective sheet and be inserted into the second fixing hole, a connecting portion connecting one end of the first insertion portion and one end of the second insertion portion, a first bending portion bent at the other end of the first insertion portion to prevent the first insertion portion from being withdrawn from the first fixing hole, and a second bending portion bent at the other end of the second insertion portion to prevent the second insertion portion from being withdrawn from the second fixing hole.

The connecting portion may be arranged on front side of the reflective sheet.

The first bending portion and the second bending portion may be arranged on the rear side of the rear chassis.

A predetermined first gap may be formed between the first insertion portion and the first fixing hole.

A predetermined second gap may be formed between the second insertion portion and the second fixing hole.

A length by which the first bending portion extends may be greater than the first gap.

A length by which the second bending portion extends may be greater than the second gap.

According to the spirit of the present disclosure, the display apparatus may be provided with improved assembly performance.

According to the spirit of the present disclosure, the display apparatus may be provided with improved productivity and uniform quality by automating the fastening of reflective sheets.

According to the spirit of the present disclosure, the display apparatus capable of preventing wrinkles on the reflective sheet due to contraction and expansion of the reflective sheet may be provided.

While the present disclosure has been particularly described with reference to exemplary embodiments, it should be understood by those of skilled in the art that various changes in form and details may be made without departing from the spirit and scope of the present disclosure.

What is claimed is:

1. A display apparatus comprising:
a display panel;
a reflective sheet on a rear side of the display panel and configured to reflect light toward the display panel;
a rear chassis configured to support the reflective sheet on a rear side of the reflective sheet, the rear chassis comprising a fixing hole; and
a fastener configured to secure the reflective sheet to the rear chassis;
wherein the fastener comprises:
an insertion portion configured to penetrate the reflective sheet and to be inserted into the fixing hole; and
a bending portion bent at a first end of the insertion portion to prevent the insertion portion from being withdrawn from the fixing hole,
wherein a gap exists between the insertion portion and an inner edge of the fixing hole, and
wherein the gap is configured to allow the insertion portion to move within the fixing hole when the reflective sheet contracts or expands.

2. The display apparatus of claim 1, wherein the reflective sheet comprises a through hole,
wherein the insertion portion is inserted into the through hole, and
wherein the insertion portion is configured to penetrate the reflective sheet and form the through hole.

3. The display apparatus of claim 1, wherein the fixing hole comprises a first fixing hole and a second fixing hole spaced apart from the first fixing hole.

4. The display apparatus of claim 3, wherein the fastener further comprises:
a first insertion portion configured to penetrate the reflective sheet and to be inserted into the first fixing hole;
a second insertion portion configured to penetrate the reflective sheet and to be inserted into the second fixing hole;
a first bending portion bent at a first end of the first insertion portion; and
a second bending portion bent at a first end of the second insertion portion.

5. The display apparatus of claim 4, wherein the first bending portion is bent toward the second fixing hole, and
wherein the second bending portion is bent toward the first fixing hole.

6. The display apparatus of claim 4, wherein the fastener further comprises a connecting portion connecting a second end of the first insertion portion and a second end of the second insertion portion, wherein the connecting portion is on a front side of the reflective sheet, and wherein the first bending portion and the second bending portion are on the rear side of the reflective sheet and the rear chassis.

7. The display apparatus of claim 4, wherein a first gap exists between the first insertion portion and an inner edge of the first fixing hole, and a second gap exists between the second insertion portion and an inner edge of the second fixing hole.

8. The display apparatus of claim 7, wherein a length of the first bending portion is greater than the first gap, and wherein a length of the second bending portion is greater than the second gap.

9. The display apparatus of claim 1, further comprising a light source module configured to supply light to a rear side of the display panel, wherein the reflective sheet comprises:

a seating portion configured to seat the light source module thereon; and an inclined portion that is inclined forwardly relative to the seating portion.

10. The display apparatus of claim 9, wherein the fixing hole is at a position corresponding to the inclined portion.

11. The display apparatus of claim 9, wherein the reflective sheet further comprises an outer portion along an edge of the inclined portion and configured to contact an edge of the rear chassis, and wherein the fixing hole is at a position corresponding to the outer portion.

12. The display apparatus of claim 9, wherein the inclined portion is darker than the seating portion such that luminance of the inclined portion is lower than luminance of the seating portion.

13. The display apparatus of claim 1, further comprising:

an optical member between the display panel and the reflective sheet; and a supporter on the reflective sheet and configured to support the optical member.

14. The display apparatus of claim 1, wherein the fastener comprises at least one of stainless steel and paper.

15. The display apparatus of claim 1, wherein the insertion portion is movably arranged within the fixing hole and is movable, within a predetermined range, relative to the rear chassis.

16. The display apparatus of claim 1, wherein the fastener comprises a staple.

17. A display apparatus comprising:

a display panel;

a reflective sheet on a rear side of the display panel;

a rear chassis supporting a rear side of the reflective sheet, the rear chassis comprising a pair of fixing holes comprising a first fixing hole and a second fixing hole; and a fastener configured to secure the reflective sheet to the rear chassis, the fastener comprising:

a first insertion portion penetrating the reflective sheet and inserted into the first fixing hole;

a second insertion portion penetrating the reflective sheet inserted into the second fixing hole;

a first bending portion bent at a first end of the first insertion portion; and a second bending portion bent at a first end of the second insertion portion, wherein a first gap exists between the first insertion portion and an inner edge of the first fixing hole, wherein a second gap exists between the second insertion portion and an inner edge of the second fixing hole, and wherein the first gap and the second gap are configured to allow the first insertion portion and the second insertion portion to respectively move within the first fixing hole and the second fixing hole when the reflective sheet contracts or expands.

18. The display apparatus of claim 17, further comprising a light source configured to supply light to the display panel, wherein the reflective sheet comprises:

a seating portion, wherein the light source is seated on the seating portion; and an inclined portion at least partially surrounding the seating portion, wherein the inclined portion is inclined forwardly relative to the seating portion.

19. The display apparatus of claim 18, wherein the pair of fixing holes are at a position corresponding to at least one of the seating portion or the inclined portion.

20. A display apparatus comprising:

a display panel;

a light source configured to supply light to the display panel;

a reflective sheet on a rear side of the display panel and the light source, the reflective sheet comprising:

a seating portion, wherein the light source is seated on the seating portion; and an inclined portion at least partially surrounding the seating portion, wherein the inclined portion is inclined forwardly relative to the seating portion;

a rear chassis supporting a rear side of the reflective sheet, the rear chassis comprising a plurality of pairs of fixing holes; and a plurality of fasteners respectively corresponding to the plurality of pairs of fixing holes, wherein the plurality of fasteners are configured to secure the reflective sheet to the rear chassis, wherein each of the plurality of pairs of fixing holes comprises a first fixing hole and a second fixing hole, wherein each of the plurality of fasteners comprises:

a first insertion portion penetrating the reflective sheet and inserted into the first fixing hole of the pair of fixing holes corresponding to the fastener;

a second insertion portion penetrating the reflective sheet inserted into the second fixing hole of the pair of fixing holes corresponding to the fastener;

a first bending portion bent at a first end of the first insertion portion; and a second bending portion bent at a first end of the second insertion portion, and wherein, for each fastener of the plurality of fasteners and the pair of fixing holes corresponding to the fastener, a first gap exists between the first insertion portion and an inner edge of the first fixing hole, a second gap exists between the second insertion portion and an inner edge of the second fixing hole, and the first gap and the second gap are configured to allow the first insertion portion and the second insertion portion to respectively move within the first fixing hole and the second fixing hole when the reflective sheet contracts or expands.

* * * * *